(12) United States Patent
Lee et al.

(10) Patent No.: US 12,439,136 B2
(45) Date of Patent: Oct. 7, 2025

(54) CAMERA MODULE WITH ROLL COMPENSATION ACTUATOR

(71) Applicant: SAMSUNG ELECTRO-MECHANICS CO., LTD., Suwon-si (KR)

(72) Inventors: Dong Hoon Lee, Suwon-si (KR); Jung Hyun Park, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 161 days.

(21) Appl. No.: 18/110,658

(22) Filed: Feb. 16, 2023

(65) Prior Publication Data

US 2023/0336850 A1  Oct. 19, 2023

(30) Foreign Application Priority Data

Apr. 15, 2022  (KR) .......................... 10-2022-0046900

(51) Int. Cl.
  *H04N 5/335*  (2011.01)
  *G03B 17/12*  (2021.01)
  *H04N 23/51*  (2023.01)

(52) U.S. Cl.
  CPC ............. *H04N 23/51* (2023.01); *G03B 17/12* (2013.01)

(58) Field of Classification Search
  CPC .................................................. G03B 17/12
  See application file for complete search history.

(56) References Cited

U.S. PATENT DOCUMENTS

| | | | | |
|---|---|---|---|---|
| 3,572,975 | A * | 3/1971 | Valbjorn | F04B 39/127 417/363 |
| 3,800,212 | A * | 3/1974 | Branco | H02K 7/1853 968/503 |
| 7,295,389 | B2 * | 11/2007 | Ohtsuka | G02B 7/023 359/821 |
| 10,356,325 | B2 * | 7/2019 | Nishitani | H04N 5/23287 |
| 11,483,459 | B2 * | 10/2022 | Saito | H04N 23/6812 |
| 2006/0017818 | A1 | 1/2006 | Enomoto | |
| 2011/0279916 | A1 * | 11/2011 | Brown | G02B 7/08 359/823 |

(Continued)

FOREIGN PATENT DOCUMENTS

| | | |
|---|---|---|
| JP | H10-39350 A | 2/1998 |
| KR | 10-2006-0046749 A | 5/2006 |

(Continued)

OTHER PUBLICATIONS

Korean Office Action issued on Oct. 23, 2023, in counterpart Korean Patent Application No. 10-2022-0046900 (7 pages in English, 5 pages in Korean).

*Primary Examiner* — Gary C Vieaux
(74) *Attorney, Agent, or Firm* — NSIP Law

(57) ABSTRACT

A camera module includes a lens module including at least one lens, a first housing accommodating the lens module therein, an image sensor disposed in the first housing, a second housing accommodating the first housing therein, a driving portion disposed in the second housing and configured to rotationally drive the first housing, and a guide member disposed between the first housing and the second housing. The guide member includes a spring, and the spring has a greater thickness in an optical axis direction than in a direction perpendicular to the optical axis direction.

9 Claims, 11 Drawing Sheets

(56) References Cited

U.S. PATENT DOCUMENTS

| | | |
|---|---|---|
| 2017/0299408 A1 | 10/2017 | Kang et al. |
| 2020/0012068 A1 | 1/2020 | Lim et al. |
| 2021/0318592 A1 | 10/2021 | Kim et al. |
| 2022/0345629 A1 | 10/2022 | Park |

FOREIGN PATENT DOCUMENTS

| | | | | |
|---|---|---|---|---|
| KR | 10-2017-0118577 A | | 10/2017 | |
| KR | 20170118577 A | * | 10/2017 | ............... G01B 7/16 |
| KR | 10-2020-0069802 A | | 6/2020 | |
| KR | 10-2021-0034205 A | | 3/2021 | |
| KR | 10-2021-0042926 A | | 4/2021 | |

* cited by examiner

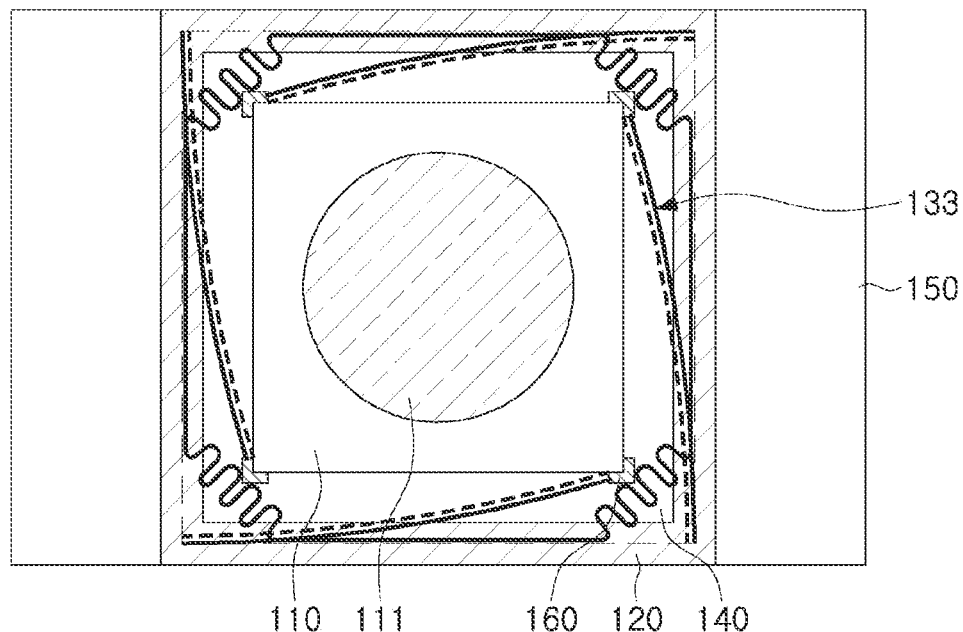

CAMERA MODULE WITH ROLL COMPENSATION ACTUATOR

CROSS-REFERENCE TO RELATED APPLICATIONS

This application claims the benefit under 35 USC 119(a) of Korean Patent Application No. 10-2022-0046900 filed on Apr. 15, 2022, in the Korean Intellectual Property Office, the entire disclosure of which is incorporated herein by reference for all purposes.

BACKGROUND

1. Field

The present disclosure relates to a camera module.

2. Description of the Background

Camera modules may be employed in mobile communication terminals such as tablet PCs, laptop computers, and the like, as well as in smartphones. In addition, such a camera module may be equipped with an AF actuator for an autofocusing (AF) function and an optical image stabilization (OIS) actuator for an OIS function.

To capture video using a smartphone, or the like, there may be a need for a function to compensate more precisely for shaking.

An OIS actuator installed in a camera module may move a lens module in a direction, perpendicular to an optical axis, in a voice coil motor (VCM) manner to compensate for shaking. The OIS actuator may additionally have a function of vertically and horizontally tilting the lens module at a predetermined angle.

However, it may be difficult for such an actuator to compensate for shaking in a roll direction with an optical axis as a rotation axis, so that an additional actuator may be required to rotate an image sensor together with the lens module.

The above information is presented as background information only to assist with an understanding of the present disclosure. No determination has been made, and no assertion is made, as to whether any of the above might be applicable as prior art with regard to the disclosure.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a camera module includes a lens module including at least one lens, a first housing accommodating the lens module therein, an image sensor disposed in the first housing, a second housing accommodating the first housing therein, a driving portion disposed in the second housing and configured to rotationally drive the first housing, and a guide member disposed between the first housing and the second housing, wherein the guide member includes a spring, and the spring has a greater thickness in an optical axis direction than in a direction perpendicular to the optical axis direction.

The spring may include a bent portion bent a plurality of times, and the bent portion may be connected to the first housing in the vicinity of a corner of the first housing.

The second housing may include a first extension portion extending in the optical axis direction, and a second extension portion extending in a direction perpendicular to the optical axis direction.

The camera module may further include a base electrically connected to at least one of the driving portion and the image sensor.

The driving portion may include at least one piezoelectric material disposed in the second housing.

The driving portion may include a plurality of shape memory alloy wires, and the plurality of shape memory alloy wires may be disposed to be symmetrical with respect to the optical axis.

In another general aspect, a camera module includes a lens module including at least one lens, a first housing accommodating the lens module therein, an image sensor disposed in the first housing, a second housing accommodating the first housing therein, a driving portion disposed in the second housing and configured to rotationally drive the first housing, and a guide member disposed between the first housing and the second housing, wherein the guide member includes a plurality of ball members, and the plurality of ball members are disposed between surfaces on which the first housing and the second housing oppose each other in an optical axis direction.

The second housing may include a first extension portion extending in the optical axis direction, and a second extension portion extending in a direction, perpendicular to the optical axis direction.

The camera module may further include a connection portion extending to a side of the second housing in the vicinity of a corner of the first housing, wherein the connection portion is disposed to oppose at least one of the second extension portion and the base in the optical axis direction.

A first guide groove may be formed in at least one of surfaces on which the connection portion and the second housing oppose each other in the optical axis direction and surfaces on which the connection portion and the base oppose each other in the optical axis direction, and one or more balls of the plurality of ball members may be disposed in the first guide groove.

The camera module may further include a second guide groove spaced apart from the first guide groove in the optical axis direction and in which one or more balls of the plurality of ball members may be disposed, wherein a size of the second guide groove may be greater than a diameter of the ball member.

The first guide groove may include a shape corresponding to a shape of an arc of a circle centered on the optical axis.

The camera module may further include a plurality of magnets provided to be spaced apart from the first guide groove in the optical axis direction and disposed on surfaces on which the connection portion and the second housing or the connection portion and the base oppose each other in the optical axis direction.

The plurality of magnets may be disposed such that regions having the same polarity oppose each other in the optical axis direction.

The driving portion may include a piezoelectric material disposed in the second housing.

The driving portion may include a plurality of shape memory alloy wires, and the plurality of shape memory alloy wires may be disposed to be symmetrical with respect to the optical axis.

In another general aspect, a camera module includes a lens module including one or more lenses disposed on an optical axis to refract light reflected from a subject, a first housing accommodating the lens module therein, an image sensor disposed in the first housing to convert light incident through the one or more lenses into an electrical signal, a second housing accommodating the first housing therein, a driving portion disposed in the second housing and configured to rotationally drive the first housing relative to the second housing, and a guide member extending from the first housing into the second housing in a plane perpendicular to the optical axis, wherein the second housing prevents movement of the guide member out of the plane perpendicular to the optical axis.

The guide member may include a spring, and the spring may have a greater thickness in an optical axis direction than in a direction perpendicular to the optical axis direction.

The guide member may include a plurality of ball members, and one or more balls of the plurality of ball members may be disposed between surfaces on which the first housing and the second housing oppose each other in an optical axis direction.

Other features and aspects will be apparent from the following detailed description, the drawings, and the claims.

BRIEF DESCRIPTION OF DRAWINGS

FIGS. 9 and 10 are conceptual views illustrating modified examples of a camera module illustrated in the conceptual diagrams of FIGS. 8A and 8B.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
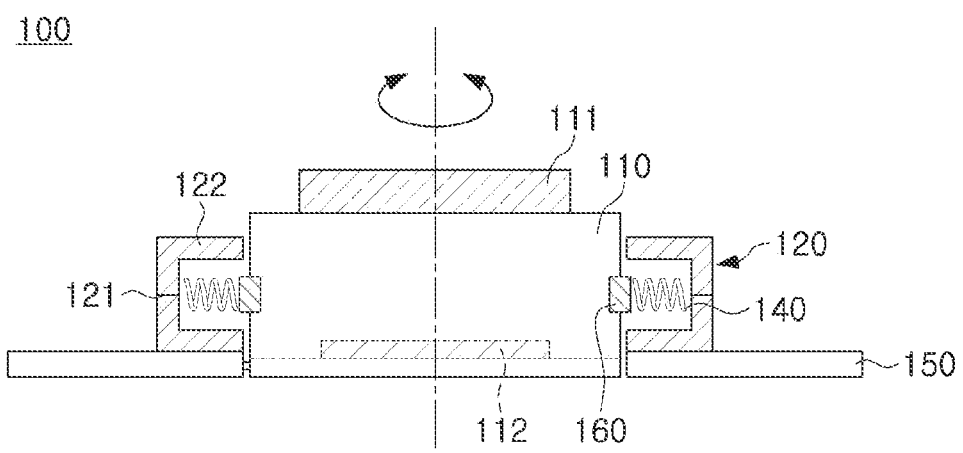
FIGS. 1A and 1B are conceptual diagrams of a camera module according to a first example (guide member-spring).

Hereinafter, while examples of the present disclosure will be described in detail with reference to the accompanying drawings, it is noted that examples are not limited to the same.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of functions and constructions that would be well known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of this disclosure.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items; likewise, "at least one of" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," "lower," and the like may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of this disclosure. Further, although the examples described herein have a variety of configurations, other configurations are possible as will be apparent after an understanding of this disclosure.

Hereinafter, examples will be described in detail with reference to the accompanying drawings.

An aspect of the present disclosure is to provide a camera module which may compensate for shaking in a roll direction with an optical axis of the camera module as a rotation axis.

The present disclosure relates to a camera module that may be used in a portable electronic device such as a smartphone, a tablet personal computer (PC), or the like.

A camera module is an optical device for capturing still or moving images. A camera module may include a lens, refracting light reflected from a subject, and a lens driving apparatus (an actuator) moving the lens to adjust a focus or to compensate for the shaking of the camera module.

Figure 1B:
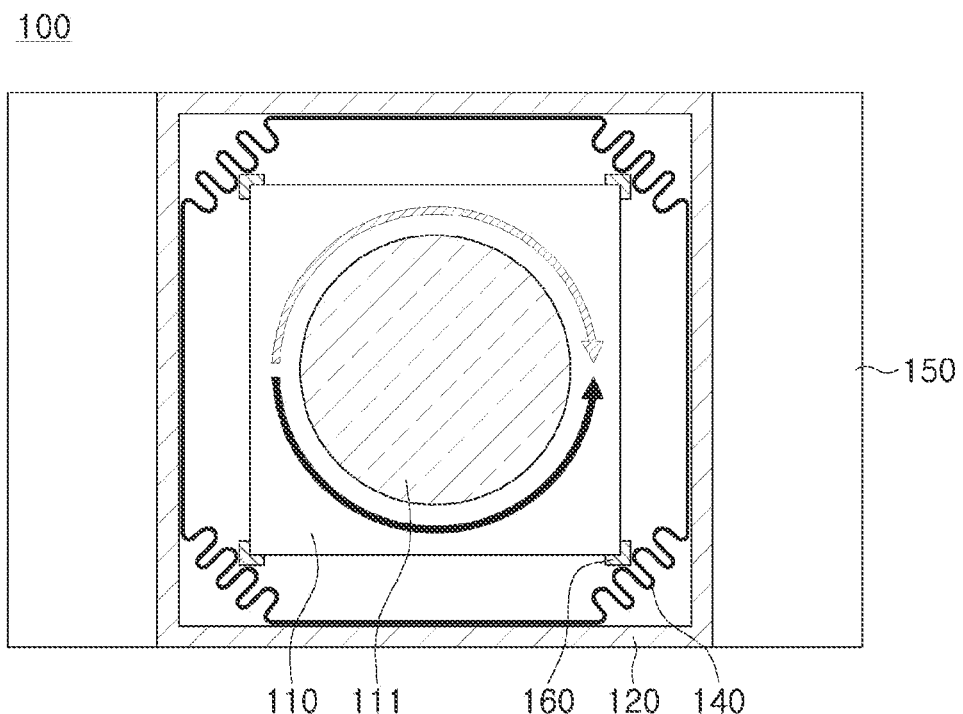
Figure 2A:
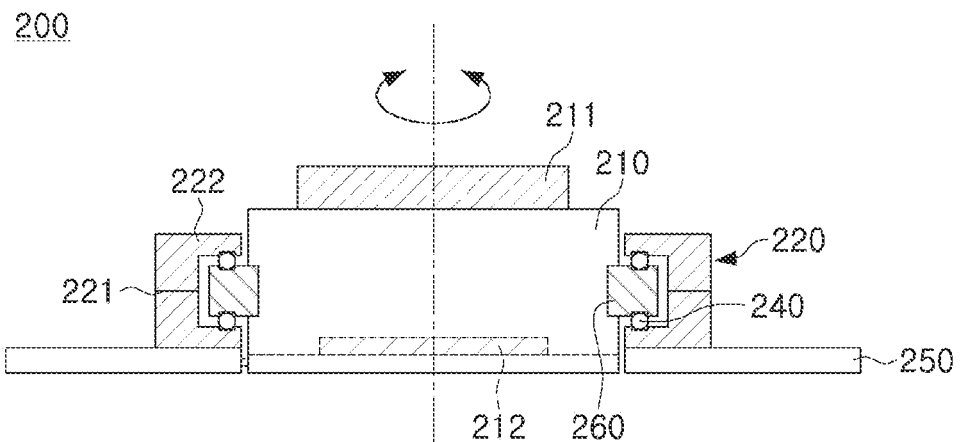
FIGS. 2A and 2B are conceptual diagrams of a camera module according to a second example (guide member-ball member).
Figure 2B:
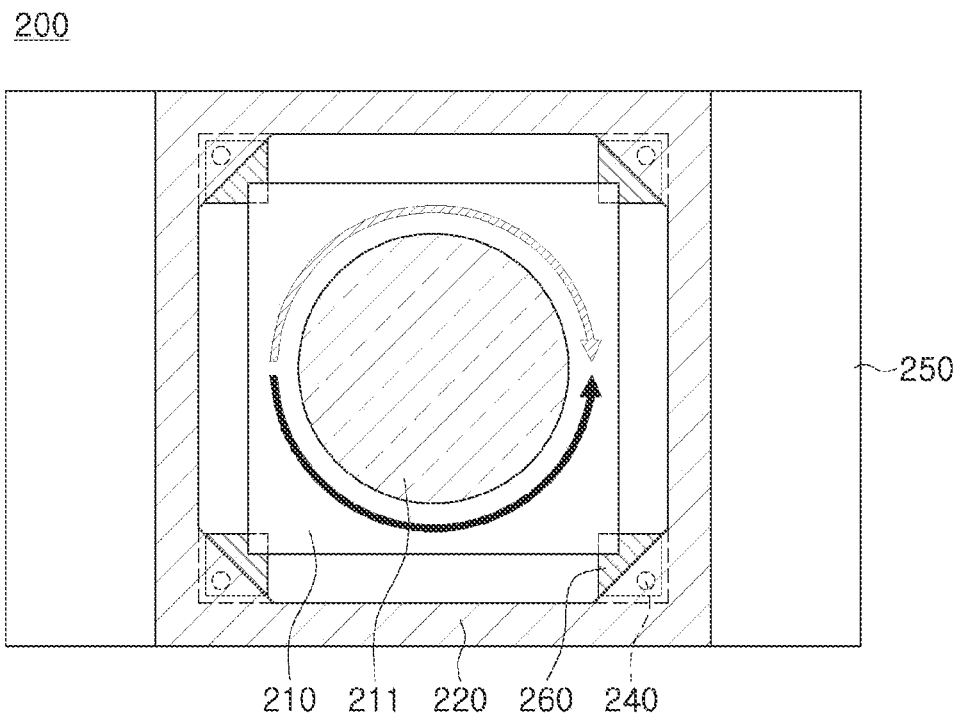

FIGS. 1A and 1B are conceptual diagrams of a camera module according to a first example (guide member-spring), and FIGS. 2A and 2B are conceptual diagrams of a camera module according to a second example (guide member-ball member).

A camera module 100 or 200 according to the present disclosure may include a first housing 110 or 210, a second housing 120 or 220, and a base 150 or 250.

The first housing 110 or 210 may accommodate a lens module 111 or 211, a lens driving device, not illustrated, and an image sensor 112 or 212.

The lens modules 111 or 211 may include one or more lenses capturing an image of a subject. When the lens modules 111 or 211 includes a plurality of lenses, each of the lenses may have the same or different optical characteristics.

The one or more lenses, constituting the lens module 111 or 211, may be installed in a lens barrel. The lens barrel may have a hollow cylindrical shape to accommodate a lens therein, and a lens or lenses may be installed in the lens barrel along an optical axis.

A lens driving device, not illustrated, may move the lens modules 111 or 211. For example, the lens driving device may include a magnet and a coil, and may move the lens modules 111 and 211 with a driving force generated by the magnet and the coil.

The lens driving device, not illustrated, may include a focusing portion, focusing lenses of the lens module 111 or 211, and a shake correction portion correcting a shake of the lens modules 111 or 211.

The focusing portion may move the lens module 111 or 211 in an optical axis direction (a Z-axis direction) to focus lenses. The shake correction portion may move the lens module 111 or 211 in directions (X-axis and Y-axis directions), perpendicular to the optical axis, to compensate for a shake during image capturing.

The shake correction portion may vertically and horizontally tilt the lens modules 111 and 211 at a predetermined angle in directions (X-axis and Y-axis directions), perpendicular to the optical axis. For example, the shake correction portion may rotate the lens modules 111 and 211 about axes (an X-axis and a Y-axis), perpendicular to the optical axis as rotational axes (pitching and yawing).

For example, the lens driving device provided in the first housings 110 and 210 may move the lens modules 111 and 211 along the optical axis (a Z-axis) and the two axes (the X-axis and the Y-axis), perpendicular to the optical axis, and may rotate the lens modules 111 and 211 about the two axes (the X-axis and the Y-axis), perpendicular to the optical axis, as rotation axes (pitching and yawning).

The image sensor 112 or 212 may convert light, incident through the lens modules 111 or 211, into an electrical signal. For example, the image sensor 112 or 212 may be a charge coupled device (CCD) or a complementary metal-oxide semiconductor (CMOS).

The image sensor 112 or 212 may be connected to a printed circuit board (PCB). For example, the image sensor 112 or 212 may be fixed to a printed circuit board and may be electrically connected to the printed circuit board through wire bonding.

The second housing 120 or 220 may accommodate the first housing 110 or 210. The second housings 120 or 220 may be disposed outside the first housing 110 or 210 to accommodate the first housing 110 or 210. The second housing 120 or 220 may have a shape of a box opened in the optical axis direction (the Z-axis direction), and thus may accommodate the first housing 110 or 210 in the optical axis direction (the Z-axis direction).

The second housing 120 or 220 may be spaced apart from the first housing 110 or 210 while accommodating the first housing 110 or 210. In addition, the second housing 120 or 220 may be provided to cover a portion of a side surface of the first housing 110 or 210 when viewed from outside. For example, the second housing 120 or 220 may be spaced apart from the first housing 110 or 210 in directions (the X-axis and the Y-axis directions), perpendicular to the optical axis direction.

The second housing 120 or 220 may include a first extension portion 121 or 221 and a second extension portion 122 or 222. The first extension portion 121 or 221 may extend in the optical axis direction (the Z-axis direction), and the second extension portion 122 or 222 may extend in a direction (the X-axis direction or the Y-axis direction), perpendicular to the optical axis direction.

The first extension portion 121 or 221 may be spaced apart from the first housing 110 or 210 in directions (the X-axis direction and the Y-axis direction), perpendicular to the optical axis direction, and may extend in the optical axis direction (the Z-axis direction).

The second extension portion 122 or 222 may extend from one end and the other end of the first extension portion 121 or 221. The second extension portion 122 or 222 may extend in the directions (the X-axis direction and the Y-axis direction), perpendicular to the optical axis, to be directed toward the first housing 110 or 210 from the one end and the other end of the first extension portion 121 or 221. In this case, an end portion of the second extension portion 122 or 222, directed toward the first housing 110 or 210, may be spaced apart from the first housing 110 or 210 in the directions (the X-axis direction and the Y-axis direction), perpendicular to the optical axis direction.

The second housing 120 or 220 may have a form in which two parts are coupled to each other. For example, the second housing 120 or 220 may include a first part and a second part coupled to each other as illustrate in the drawings. The first part may include the second extension portion 122 or 222 extending from a portion of the first extension portion 121 or 221 and one end of the first extension portion 121 or 221. The second part may include the second extension portion 122 or 222 extending from a portion of the first extension portion 121 or 221 and the other end of the first extension portion 121 or 221.

In the first housing 110 or 210 and the second housing 120 or 220, a drive portion rotating and driving the first housing 110 or 210 and a guide member guiding rotation of the first housing 110 or 210 may be disposed. Detailed descriptions thereof will be described later.

The camera module 100 or 200 may include base 150 or 250. The base 150 or 250 may be a substrate and may be, for example, a printed circuit board (PCB) or a flexible printed circuit board (FPCB).

The base 150 or 250 may be electrically connected to a driving portion 130 or 230 disposed in the second housing 120 or 220. Also, the base 150 or 250 may be electrically connected to the image sensor 112 or 212 disposed in the first housing 110 or 210.

As an example, the base 150 or 250 may include a rigid substrate and a flexible substrate. The rigid substrate may be electrically connected to the driving portion 130 or 230 of the second housing 120 or 220, and the flexible substrate may be electrically connected to the image sensor 112 or 212 of the first housing 110 or 210.

As another example, the base 150 or 250 may be provided as a single substrate and may include a rigid region and a flexible region. The rigid area may be electrically connected to the driving portion 130 or 230 of the second housing 120 or 220, and the flexible area may be electrically connected to the image sensor 112 or 212 of the first housing 110 or 210.

In an example, the base 150 or 250 may accommodate the first housing 110 or 210. The base 150 or 250 may be disposed outside the first housing 110 or 210 to accommodate the first housing 110 or 210. The base 150 or 250 may have a shape of a box opened in the optical axis direction (the Z-axis direction), and thus may accommodate the first housing 110 or 210 in the optical axis direction (the Z-axis direction). Due to such a structure, an increase in the thickness of the camera module 100 or 200 in the optical axis direction (the Z-axis direction) may be significantly reduced.

In addition, the base 150 or 250 may be disposed below the second housing 120 or 220.

The second housing 120 or 220 may include first extension portion 121 or 221 extending in the optical axis direction (the Z-axis direction) on the substrate 150 or 250, and the driving portion 130 or 230 may be disposed at the first extension portion 121 or 221. Due to such a structure, an increase in the thickness of the camera module 100 or 200 in the directions (the X-axis direction and the Y-axis direction), perpendicular to the optical axis, may be significantly reduced.

A driving portion may be disposed in the second housing 120 or 220 to rotationally drive the first housing 110 or 210.

The driving portion may be disposed on the first extension portion 121 or 221 of the second housing 120 or 220. The driver may be disposed on the second housing 120 or 220 to receive an electrical signal for providing driving force to the first housing 110 or 210 from the substrate 150 or 250 to be described later.

The driving portion may be disposed in the second housing 120 or 220, and may be connected to the first housing 110 or 210. The driving portion may be connected to the first housing 110 or 210 in the vicinity of a corner of the first housing 110 or 210.

The driving portion may be directly connected to the first housing 110 or 210 in the vicinity of the corner of the first housing 110 or 210, or may be connected to the first housing 110 or 210 through an intermediary portion 170 or 270 in the vicinity of the corner of the first housing 110 or 210.

According to the present disclosure, the driving portion may drive the first housing 110 or 210 such that the first housing 110 or 210 rotates about the optical axis (the Z-axis) as a rotation axis. The first housing 110 or 210 may be rotated clockwise or counterclockwise about the optical axis (the Z-axis) as a rotation axis. For example, the first housing 110 or 210 may be rolled in a roll direction by the driving portion.

In the present disclosure, for ease of description, it has been set forth that the first housing 110 or 210 rotates with the optical axis (the Z-axis) as the rotation axis. However, when the first housing 110 or 210 rotates, a rotation axis thereof may not match the optical axis (the Z-axis).

When the first housing 110 or 210 is rotated by the driving portion, the lens module 111 or 211 and the image sensor 112 or 212 accommodated in the first housing 110 or 210 may be driven together with the first housing 110 or 210.

For example, according to the present disclosure, the driving portion may rotate and drive an entirety of the first housing 110 or 210, and the driving portion may provide sufficient driving force to drive the entirety of the first housing 110 or 210.

In an example, the driving portion may be provided as a piezoelectric material 131 or 231 or a shape memory alloy (SMA) 132 or 232. Also, the driving portion may be provided as a magnet and a coil, similarly to the above-described lens driving device of the first housing 110 or 210. A detailed description related to an example of the driving portion will be described later.

The camera module 100 or 200 may include a guide member guiding rotation of the first housing 110 or 210 while supporting the first housing 110 or 210. The guide member may guide rotation of the first housing 110 or 210 performed by the driving force provided through the driving portion.

To this end, the guide members may be connected to each of the first housing 110 or 210 and the second housing 120 or 220. In addition, the guide member may be connected to the first housing 110 or 210 in the vicinity of the corner of the first housing 110 or 210.

According to the present disclosure, the guide member may guide a rotation of the first housing 110 or 210 with the optical axis (the Z-axis), as a rotation axis, while limiting a movement of the first housing 110 or 210 in the optical axis direction (the Z-axis direction).

In an example, the guide member may be provided as a spring 140 or a ball member 240.

The camera module 100 illustrated in FIGS. 1A and 1B may be an example in which the spring 140 is provided as the guide member, and the camera module illustrated in FIGS. 2A and 2B is an example in which the ball member 240 is provided as the guide member.

According to the first example, as illustrated in FIGS. 1A and 1B, the guide member may be provided as the spring 140. When the guide member is provided as the spring 140, the first housing 110 may be guided to rotate about the optical axis (the Z-axis) as a rotation axis by the elastic force of the spring 140.

The spring 140 may be disposed along a periphery of the second housing 120 on a plane, perpendicular to the optical axis direction (the Z-axis direction), and the spring 140 may be structurally connected to the housing 110 at a plurality of points to support the first housing 110.

In addition, the spring 140 may have an elastic force acting in the vicinity of the corner of the first housing 110 to guide the rotation of the first housing 110 about the optical axis (the Z-axis) as a rotation axis. For example, the spring 140 may include a bent portion bent two or more times, and may be connected to the first housing 110 in the vicinity of the corner of the first housing 110 through the bent portion. In addition, the spring 140 may be directly connected to the first housing 110 in the vicinity of the corner of the first housing 110, or may be connected to the first housing 110 through a connection portion 160 formed in the vicinity of the corner of the first housing 110.

The spring 140 may be provided such that a thickness thereof in the optical axis direction (the Z-axis direction) is greater than a thickness thereof in a direction in directions (the X-axis direction and the Y-axis direction), perpendicular to the optical axis direction. Accordingly, elastic restoring force of the spring 140 may be provided to a plane, perpendicular to the optical axis direction (the Z-axis direction), and may not be provided in the optical axis direction (the Z-axis direction).

According to the second example, as illustrated in FIGS. 2A and 2B, the guide member may be provided as the ball member 240. The ball member 240 may guide rotation of the first housing 210 while supporting the first housing 210. Also, the ball member 240 may serve to maintain a distance between the second housing 220 and the connection portion 260 to be described later.

The ball member 240 may be disposed on a plane, perpendicular to the optical axis direction (the Z-axis direction) to limit a movement of the first housing 210 in the optical axis direction (the Z-axis direction). Since the ball member 240 moves in a rolling motion on a plane, the ball member 240 may be disposed on the plane, perpendicular to the optical axis direction (the Z-axis direction), to limit the movement of the first housing 210 in the optical axis direction (the Z-axis direction).

The ball member 240 may be disposed in the connection portion 260 connecting the first housing 210 and the second housing 220 to each other on the plane, perpendicular to the optical axis direction (the Z-axis direction). The connection portion 260 may be a portion of the first housing 210 or may be manufactured to be independent of the first housing 210.

In more detail, the ball member 240 may be disposed between the second housing 220 and the connection portion 260 to guide the rotation of the first housing 210 while supporting the first housing 210.

The connection portion 260 may be formed to extend toward the second housing 220 from a side of the first housing 210 in the directions (the X-axis direction and the Y-axis direction), perpendicular to the optical axis. The connection portion 260 may extend toward the second housing 220 to partially overlap the second housing 220.

The connection portion 260 may be continuously formed along the periphery of the first housing 210, or may be discontinuously formed at a plurality of points of the first housing 210.

In the second example, the connection portion 260 may be provided to dispose the guide member, for example, the ball member 240. Therefore, when the connection portion 260 is discontinuously formed at a plurality of points, the connection portion 260 may be formed in the vicinity of the corner of the first housing 210. In this case, the connection portion 260 may be formed in the vicinity of at least two places of the corner of the first housing 210.

The ball member 240 may be disposed between the second housing 220 and the connection portion 260 in the vicinity of the corner of the first housing 210 to guide the rotation of the first housing 210 with the optical axis (the Z-axis) as a rotation axis. In addition, the ball member 240 may be provided in the vicinity of at least two places of the corner of the first housing 210 to support the first housing 210.

Hereinafter, a region in which the ball member 240 is disposed will be described in more detail.

The connection portion 260 may be disposed between the second extension portions 222 of the second housing 220.

For example, the second housing 220 may include a first extension portion 221, extending in the optical axis direction (the Z-axis direction), and a second extension portion 222 extending in the directions (the X-axis direction and the Y-axis direction), perpendicular to the optical axis direction.

In addition, the second extension portion 222 may include an upper second extension portion 222a, extending from one end of the first extension portion 221 toward the first housing 210 in the direction perpendicular to the optical axis direction (the X-axis direction and the Y-axis directions), and a lower second extension 222b extending from the other end of the first extension portion 221 toward the first housing 210 in the direction perpendicular to the optical axis direction (the X-axis direction and the Y-axis directions).

The connection portion 260 may be disposed between the upper second extension portion 222a and the lower second extension portion 222b, and the ball member 242 may be disposed between the upper second extension portion 222a and the connection portion 260 and between the lower second extension portion 222b and the connection portion 260. For example, ball members 240 may be provided in two stages in the optical axis direction (the Z-axis direction).

Figure 3A:
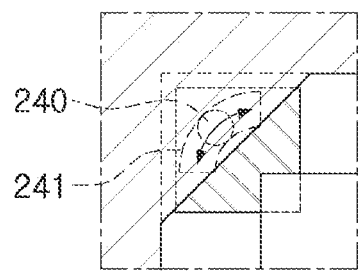
FIGS. 3A and 3B are conceptual diagrams of a guide groove shape.
Figure 3B:
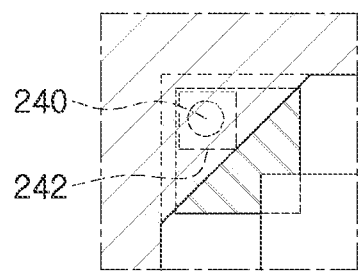

FIGS. 3A and 3B are conceptual diagrams of a guide groove shape.

Referring to FIGS. 2A, 2B, 3A, 3B, and 3C, the ball member 240 may be disposed between the connection portion 260 and the upper and lower second extension portions 222a and 222b, and the connection portion 260 and the second extension portion 222 may include guide grooves 241 and 242, accommodating the ball member 240 on surfaces opposing each other, respectively.

The upper second extension portion 222a and the connection portion 260 may include guide grooves 241 and 242 accommodating the ball member 240 on surfaces opposing each other in the optical axis direction (the Z-axis direction).

Hereinafter, a guide groove, formed in an upper surface of the connection portion 260 and a lower surface of the upper second extension portion 222a opposing the upper surface of the connection portion 260 in the optical axis direction (the Z-axis direction), will be defined as a first guide groove.

The ball member 240 may be accommodated in the first guide groove to be fitted between the second housing 220 and the connection portion 260. The upper second extension portion 222a and the connection portion 260 may be spaced apart from each other in the optical axis direction (the Z-axis direction) by the ball member 240 disposed in the first guide groove.

The lower second extension portion 222b and the connection portion 260 may include guide grooves 241 and 242 accommodating the ball member 240 on surfaces opposing each other in the optical axis direction (the Z-axis direction).

Hereinafter, a guide groove, formed in a lower surface of the connection portion 260 and an upper surface of the lower second extension portion 222b opposing the lower surface of the connection portion 260 in the optical axis direction (the Z-axis direction), will be defined as a second guide groove.

The ball member 240 may be accommodated in the second guide groove to be fitted between the second housing 220 and the connection portion 260. The lower second extension portion part 222b and the connection portion 260 may be spaced apart from each other in the optical axis direction (the Z-axis direction) by the ball member 240 disposed in the second guide groove.

The definitions of the first guide groove and the second guide groove are given for ease of description. To the contrary, a guide groove, formed in the upper surface of the connection portion 260 and lower surface of the upper second extension portion 222a opposing the upper surface of the connection portion 260 in the optical axis direction (the Z-axis direction), may be a second guide groove, and a guide groove, formed in the lower surface of the connection portion 260 and the upper surface of the lower second extension portion 222b opposing the lower surface of the connection portion 260 in the optical axis direction (the Z-axis direction), may be a first guide groove.

According to an example, the guide groove may include a main guide groove 241, mainly guiding the movement of the ball member 240, and an auxiliary guide groove 242 assisting the movement of the ball member 240.

Referring to FIG. 3A, the main guide groove 241 may be formed to have a curved shape.

For example, the main guide groove 241 may have a shape of an arc of a circle centered on an optical axis (the Z-axis).

In addition, the main guide groove 241 may be formed to have a groove, and the ball member 240 accommodated in the main guide groove 241 may move in a rolling motion according to the shape of the main guide groove 241 when a driving force is generated by the driving portion.

Referring to FIG. 3B, the auxiliary guide groove 242 may have a rectangular shape, and a surface thereof contacting the ball member 240 may have a flat shape. Accordingly, the ball member 240 accommodated in the auxiliary guide groove 242 may freely move in a rolling motion on a plane, perpendicular to the optical axis direction (the Z-axis direction), in the auxiliary guide groove 242.

In FIG. 3B, the auxiliary guide groove 242 is illustrated as having a rectangular shape, but the shape of the auxiliary guide groove 242 is not limited thereto.

Figure 3C:
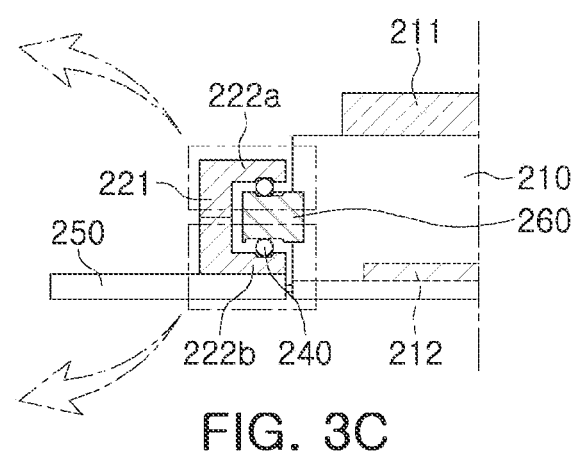
FIG. 3C illustrates a portion of a camera module illustrated in the conceptual diagrams of FIGS. 2A and 2B.

In addition, in FIGS. 3A, 3B, and 3C, the main guide groove 241 is illustrated as being formed in the first guide groove and the auxiliary guide groove 242 is illustrated as being formed in the second guide groove, but locations in which the main guide groove 241 and the auxiliary guide groove 242 are formed are not limited thereto.

Figure 4:
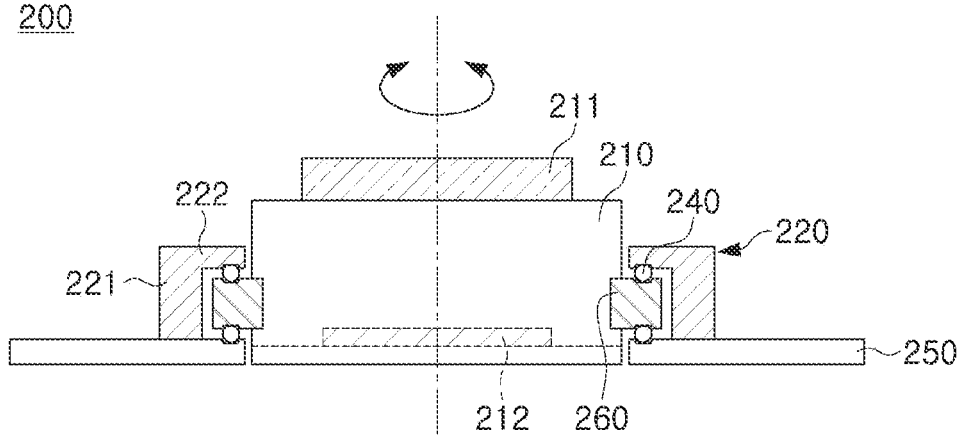
FIGS. 4 and 5 are conceptual diagrams illustrating modified examples of a camera module illustrated in the conceptual diagrams of FIGS. 2A and 2B.
Figure 5:
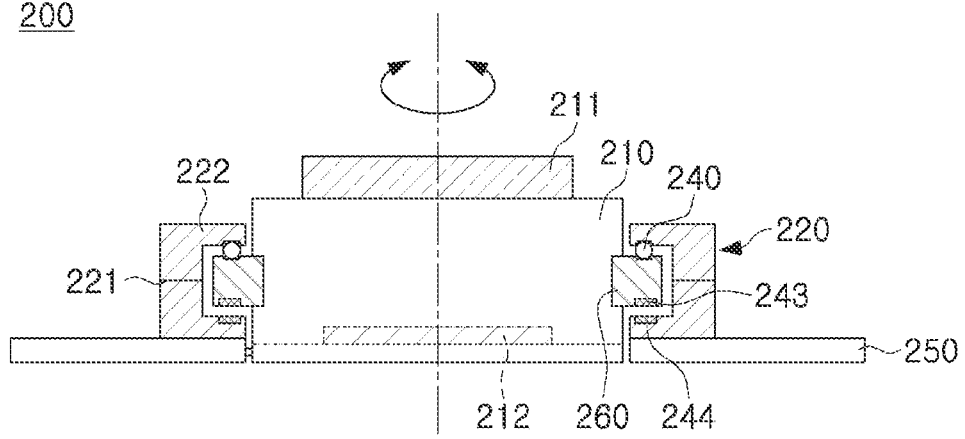

FIGS. 4 and 5 are conceptual diagrams illustrating modified examples of a camera module illustrated in the conceptual diagrams of FIGS. 2A and 2B.

Referring to FIG. 4, a ball member 240 may be disposed between a connection portion 260 and a second extension portion 222 and between the connection portion 260 and a base 250. Each of the connection portion 260, a second extension portion 222, and the base 250 may have guide grooves 241 and 242 accommodating the ball member 240 on surfaces opposing each other in an optical axis direction (the Z-axis direction).

According to the modified example illustrated in FIG. 4, a guide groove, formed in an upper surface of the connection portion 260 and a lower surface of a second extension portion 222 opposing the upper surface of the connection portion 260 in the optical axis direction (the Z-axis direction) may be a first guide groove, and a guide groove, formed in a lower surface of the connection portion 260 and an upper surface of the base 250 opposing the lower surface of the connection portion 260 in the optical axis direction (the Z-axis direction), may be a second guide groove.

A main guide groove 241 and an auxiliary guide groove 242 may be formed in the first guide groove and the second guide groove, respectively. Alternatively, an auxiliary guide groove 242 may be formed in the first guide groove and a main guide groove 241 may be formed in the second guide groove.

Referring to FIG. 5, a camera module 200 according to the present disclosure may include a ball member 240 and magnets 243 and 244, rather than ball members 240 in two stages.

For example, the ball member 240 may be disposed between an upper second extension portion 222a and the connection portion 260, and the magnets 243 and 244 may be disposed between a lower second extension portion part 222b and the connection portion 260.

The ball member 240 may be provided in the guide grooves 241 and 242 and may move in a rolling motion to guide a rotation of the first housing 210. The guide groove formed in the upper second extension portion 222a and the connection portion 260 may include the main guide groove 241 and auxiliary guide groove 242 described above.

The magnets 243 and 244 may be disposed to oppose each other between the lower second extension portion 222b and the connection portion 260. In this case, the lower second extension portion 222b and the connection portion 260 may have grooves accommodating the magnets 243 and 244, respectively.

The magnet 243 disposed on the connection portion 260 and the magnet 244 disposed on the lower second extension portion 222b may be disposed to oppose each other, and repulsive force may act therebetween. For example, the magnets 243 and 244 may be disposed such that N-poles oppose each other or S-poles oppose each other. Accordingly, the ball member 240 may move in a rolling motion in a state of being in close contact with the guide grooves 241 and 242.

To the contrary, the magnets 243 and 244 may be disposed between the upper second extension portion 222a and the connection portion 260 and between the lower second extension portion 222b and the connection portion 260. In some examples, the ball member 240 may be disposed between the lower second extension portion 222b and the connection portion 260.

The magnets 243 and 244 may be disposed between the base 250 and the connection portion 260 in the example of FIG. 4 in which the lower second extension portion 222b is omitted.

Hereinafter, various examples of the driving portion of the camera module 100 or 200 according to the present disclosure will be described.

Figure 6A:
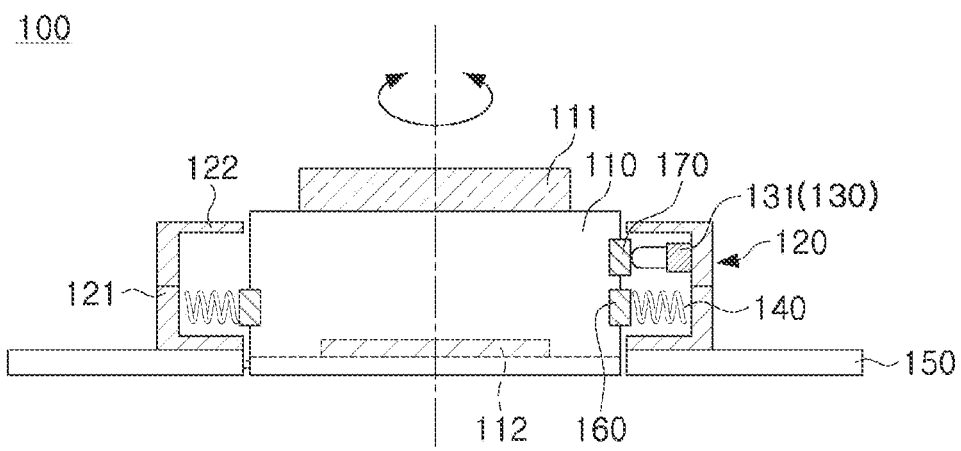
FIGS. 6A and 6B are conceptual diagrams of a camera module provided with a piezoelectric material illustrated in the conceptual diagrams of FIGS. 1A and 1B.
Figure 6B:
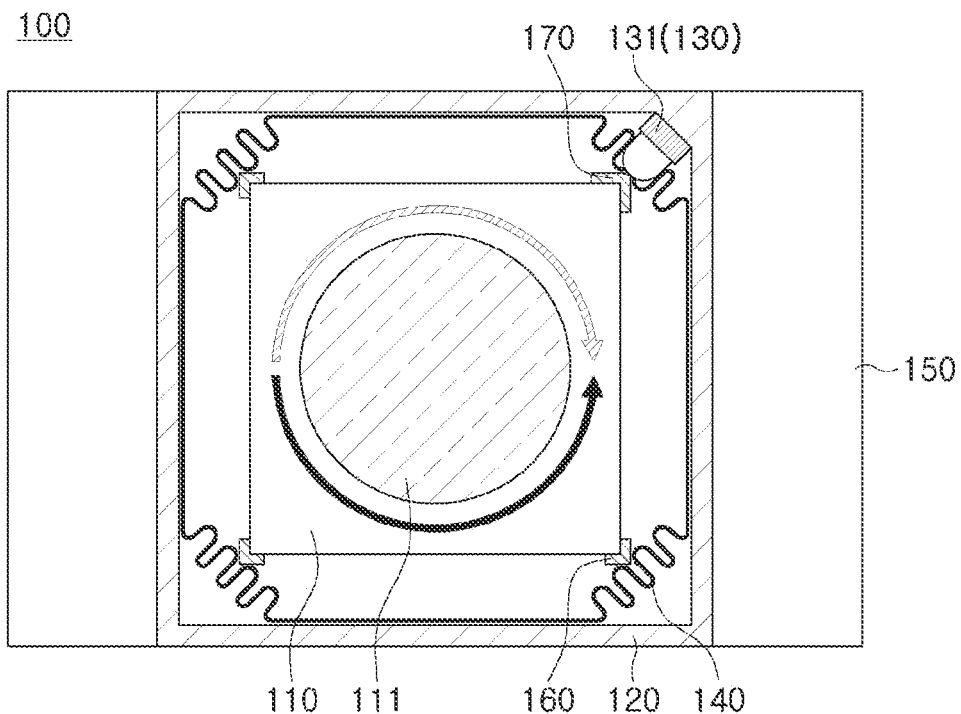
Figure 7A:
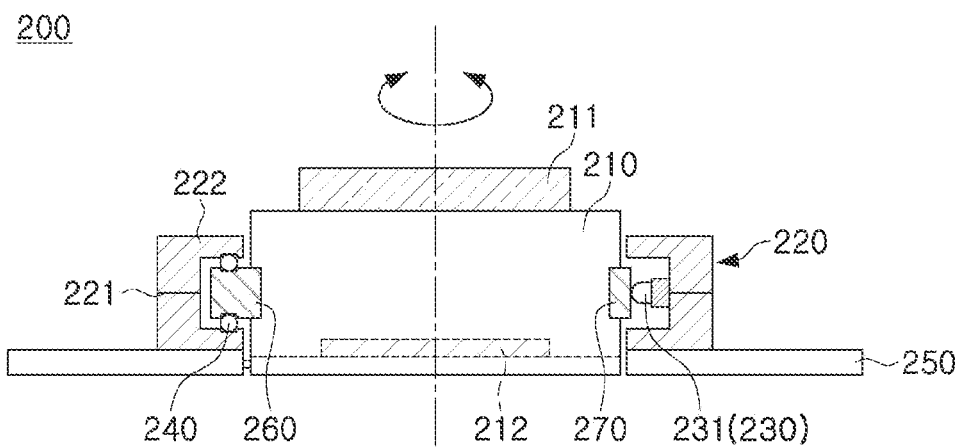
FIGS. 7A and 7B are conceptual diagrams of a camera module provided with a piezoelectric material illustrated in the conceptual diagrams of FIGS. 2A and 2B.
Figure 7B:
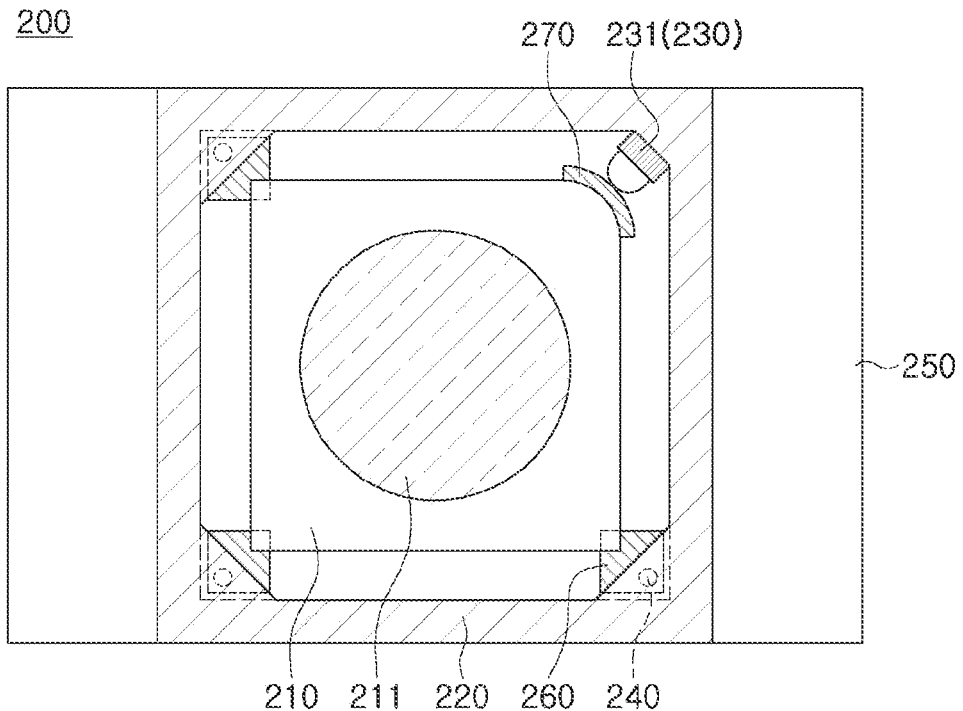

FIGS. 6A and 6B are conceptual diagrams of a camera module including a piezoelectric material illustrated in the conceptual diagrams of FIGS. 1A and 1B, and FIGS. 7A and 7B are conceptual diagrams of a camera module including a piezoelectric material illustrated in the conceptual diagrams of FIGS. 2A and 2B.

According to an example, a camera module 100 or 200 may include a piezoelectric material 131 or 231 as a driving portion 130 or 230. The piezoelectric material 131 or 231 may include a portion, to which a voltage is applied, and a portion transmitting driving force.

The piezoelectric material 131 or 231 may be disposed in a second housing 120 or 220 and physically connected to a first housing 110 or 210. For example, one side of the piezoelectric material 131 or 231 may be disposed on the first extension portion 121 or 221 of the second housing 120 or 220, and the other side of the piezoelectric material 131 or 231 may be connected to the first housing 110 or 210 through an intermediary portion 170 and 270.

In the piezoelectric material 131 or 231, the portion to which a voltage is applied may be disposed in the second housing 120 or 220 and the portion transmitting the driving force may be disposed in the first housing 110 or 210 through the intermediary portion 170 or 270.

The intermediary portion 170 or 270 may be connected to the piezoelectric materials 131 and 231 to transfer driving force, generated by the piezoelectric materials 131 and 231, to the first housing 110 or 210.

The intermediary portion 170 or 270 may be formed in the vicinity of a corner of the first housing 110 or 210, and the other side of the piezoelectric material 131 or 231 may contact the intermediary portion 170 or 270. In this case, the other side of the piezoelectric material 131 or 231 may closely contact the intermediary portion 170 or 270. In addition, a portion of the intermediary portion 170 or 270 contacting the piezoelectric material 131 or 231 may be formed as a curved surface. Accordingly, the first housing 110 or 210 may rotate clockwise or counterclockwise through the driving force transmitted by the piezoelectric materials 131 and 231, and a spring 140 or a ball member 240, a guide member, may guide a rotation of the first housing 110 or 210.

The piezoelectric material 131 or 231 may receive an electrical signal from a substrate (base) 150 or 250 to be driven. For example, according to the present disclosure, the driving force of the piezoelectric material 131 or 231 may be due to a reverse piezoelectric phenomenon. The piezoelectric material 131 or 231 may repeatedly contract and relax as a voltage is applied, and driving force may be generated during such a process.

The piezoelectric material 131 or 231 may be provided in plural, and the plurality of piezoelectric materials 131 or 231 may be disposed to be connected to the vicinity of different corners of the first housing 110 or 210, respectively.

When the guide member is provided as a spring 140, the spring 140 may be disposed to be connected to each of the first housing 110 and the second housing 120 above or below the piezoelectric material 131.

On the other hand, when the guide member is provided as a ball member 240, the ball member 240 may be disposed in the vicinity of the corner of the first housing 210 in which the piezoelectric material 231 is not disposed.

Figure 8A:
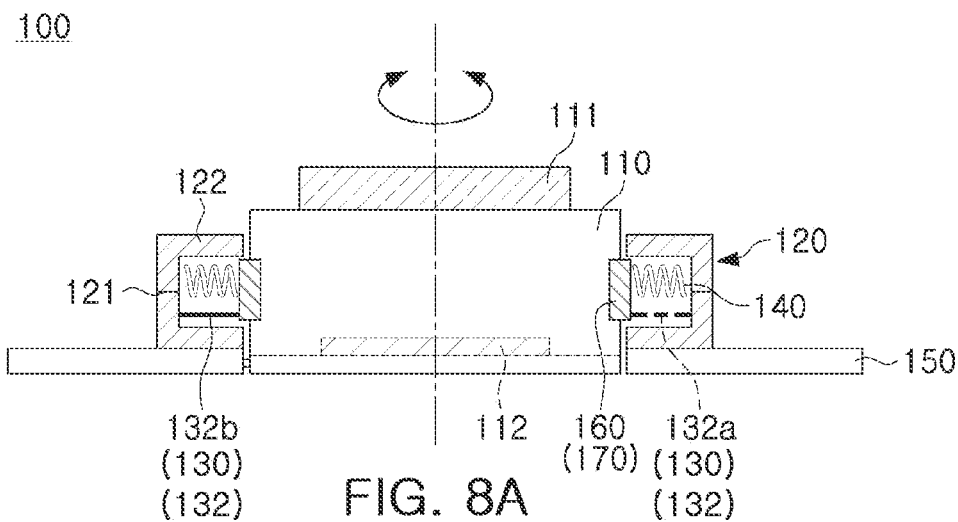
FIGS. 8A and 8B are conceptual diagrams of a camera module provided with a shape memory alloy wire illustrated in the conceptual diagrams of FIGS. 1A and 1B.
Figure 8B:
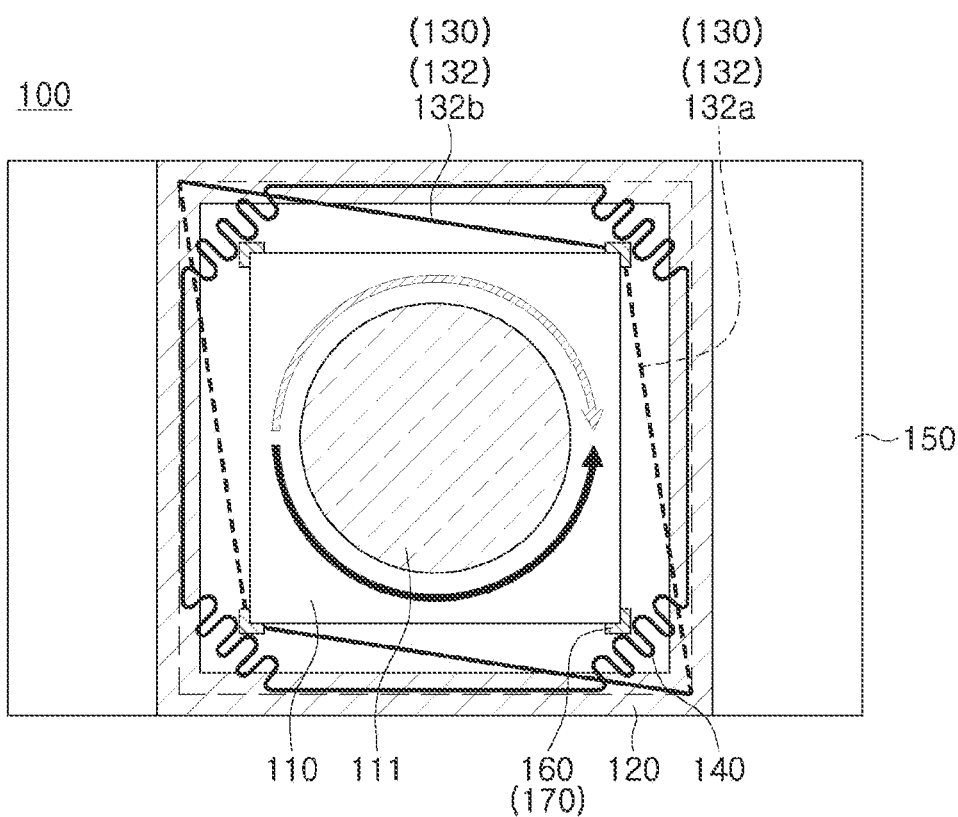

FIGS. 8A and 8B are conceptual diagrams of a camera module provided with a shape memory alloy wire illustrated in the conceptual diagrams of FIGS. 1A and 1B, and FIGS. 11A and 11B are conceptual diagrams of the camera module provided with a shape memory alloy wire illustrated in the conceptual diagrams of FIGS. 2A and 2B.

According to an example, the camera module 100 or 200 may include a shape memory alloy wire 132 or 232 as a driving portion 130 or 230. The shape memory alloy wire 132 or 232 may be provided in plural, and may be provided as a pair of wires 132a and 132b or 232a and 232b opposing each other.

The shape memory alloy wire 132 or 232 may be simultaneously connected to the first housing 110 or 210 and the second housing 120 or 220. For example, one side of the shape memory alloy wire 132 or 232 may be connected to the vicinity of the corner of the first housing 110 or 210, and the other side of the shape memory alloy wire 132 or 232 may be connected to the first extension portion 121 or 221 of the second housing 120 or 220.

In addition, the shape memory alloy wire 132 or 232 may be directly connected to the first housing 110 or 210 in the vicinity of the corner of the first housing 110 or 210, or may be connected to the first housing 110 or 210 through an intermediary portion 170 or 270.

The intermediary portion 170 or 270 may be provided to be independent of the connection portion 160 or 260 to which the guide members are connected, or may be formed to be integrated with the connection portion 160 or 260. In the latter case, the connection portion 160 or 260 may be the intermediary portion 170 and 270.

The intermediary portion 170 or 270 may be connected to the shape memory alloy wire 132 or 232 to transmit driving force, generated by the shape memory alloy wire 132 or 232, to the first housing 110 or 210.

The shape memory alloy wire 132 or 232 may be disposed to be symmetrical with respect to the optical axis (the Z-axis). As an example, the pair of shape memory alloy wires 132a and 132b or 232a and 232b may be connected to the first housing 110 or 210 in the vicinity of the corners of the first housing 110 or 210, opposing each other with respect to the optical axis (the Z-axis), and may be connected to the first extension portion 121 or 221 of the second housing 120 or 220 on a side of the vicinity of the remaining corners of the first housing 110 or 210 to which the shape memory alloy wires 132a and 132b or 232a and 232b are not connected. For example, the pair of shape memory alloy wires 132a and 132b or 232a and 232b may be disposed to have a rhombic shape on a plane, perpendicular to the optical axis direction (the Z-axis direction).

The shape memory alloy wires 132 and 232 may receive a voltage from the substrates 150 and 250, respectively, to be driven. As an example, the shape memory alloy wire 132 or 232 may contract and/or relax depending on the amount of current to change a length thereof, and driving force may be generated in such a process.

In FIGS. 7A, 7B, 11A, and 11B, a voltage may be equivalently applied to the pair of shape memory alloy wires 132a and 132b or 232a and 232b opposing each other. Thus, the pair of shape memory alloy wires 132a and 132b or 232a and 232b opposing each other may be subjected to the same deformation.

For example, a voltage may be applied such that current of a certain amount or more flows through a pair of shape memory alloy wires (hereinafter referred to as first shape memory alloy wires) 132a or 232a opposing each other in the X-axis direction based on the drawings. Accordingly, the first shape memory alloy wires 132a or 232a may be contracted to be deformed. At the same time, a voltage may be applied such that current of a certain amount or less flows through a pair of shape memory alloy wires (hereinafter referred to as second shape memory alloy wires) 132b or 232b opposing each other in the Y-axis direction based on the drawings. Accordingly, the second shape memory alloy wires 132b or 232b may be relaxed to be deformed. In this case, the first housing 110 or 210 may rotate clockwise around the optical axis (the Z-axis) as a rotation axis.

On the other hand, when a voltage is applied to the first shape memory alloy wires 132a or 232a and the second shape memory alloy wires 132b or 232b in a manner opposite to that described above, the first housing 110 or 210 may rotate counterclockwise around the optical axis (the Z-axis) as a rotation axis.

As described above, the first housing 110 or 210 may rotate clockwise or counterclockwise through the driving force transmitted by the shape memory alloy wires 132 or 232, and the spring 140 or the ball member 240, a guide member, may guide a rotation of the first housing 110 or 210.

On the other hand, when the guide member is provided as the spring 140, the spring 140 may be disposed to be connected to the first housing 110 and the second housing 120 above or below the shape memory alloy wire 132.

When the guide member is provided as the ball member 240, the shape memory alloy wire 232 may be connected to the first housing 210 through the connection portion 260, the ball member 240 may be disposed on each of upper and lower surfaces of the connection portion 260, and the shape memory alloy wire 232 may be connected to a side surface of the connection portion 260.

Figure 11A:
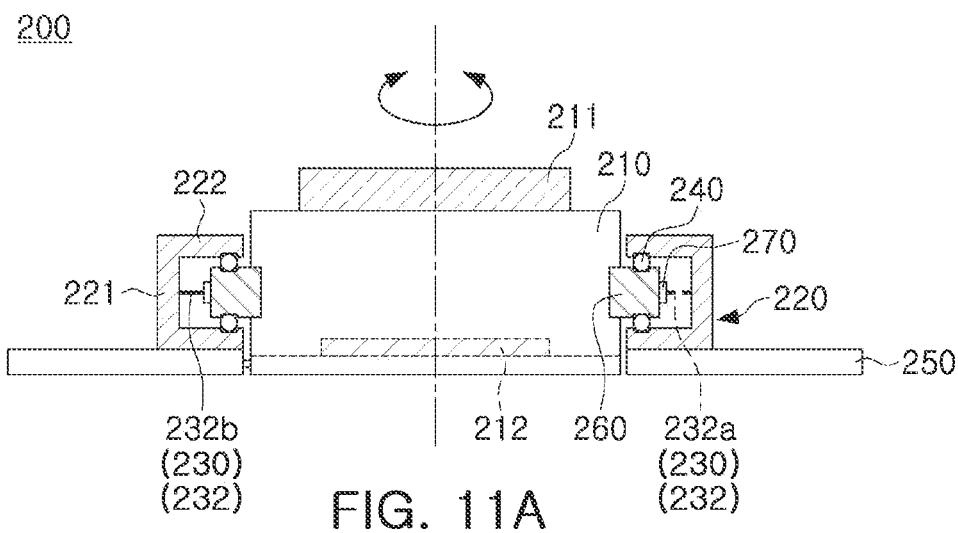
FIGS. 11A and 11B are conceptual diagrams of the camera module provided with a shape memory alloy wire illustrated in the conceptual diagrams of FIGS. 2A and 2B.
Figure 11B:
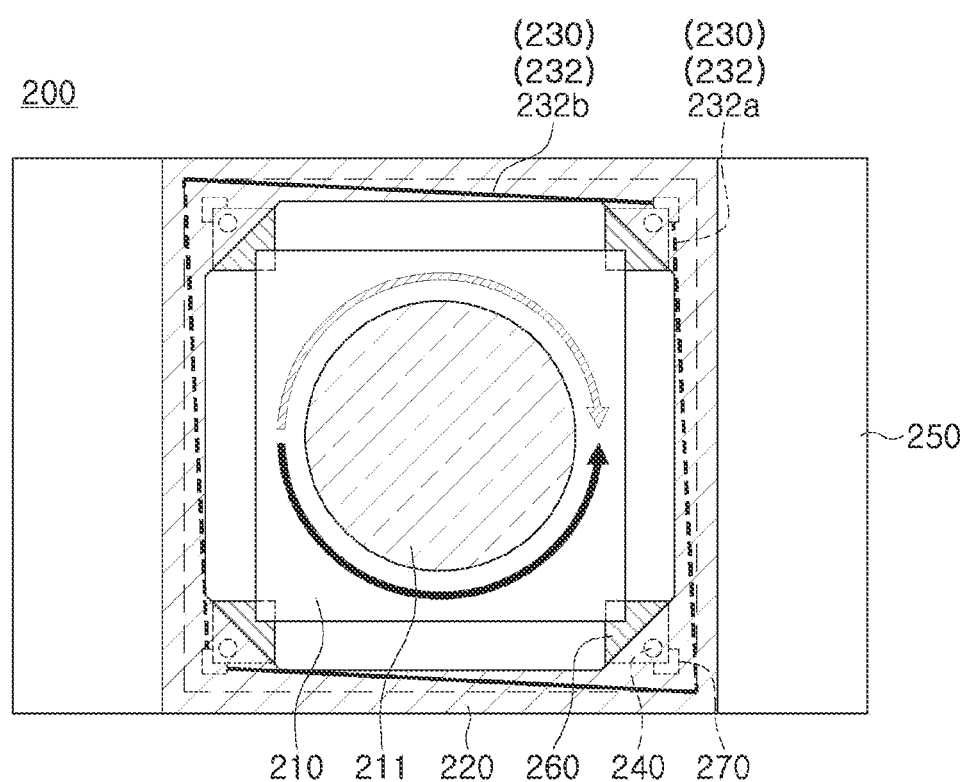
Figure 12:
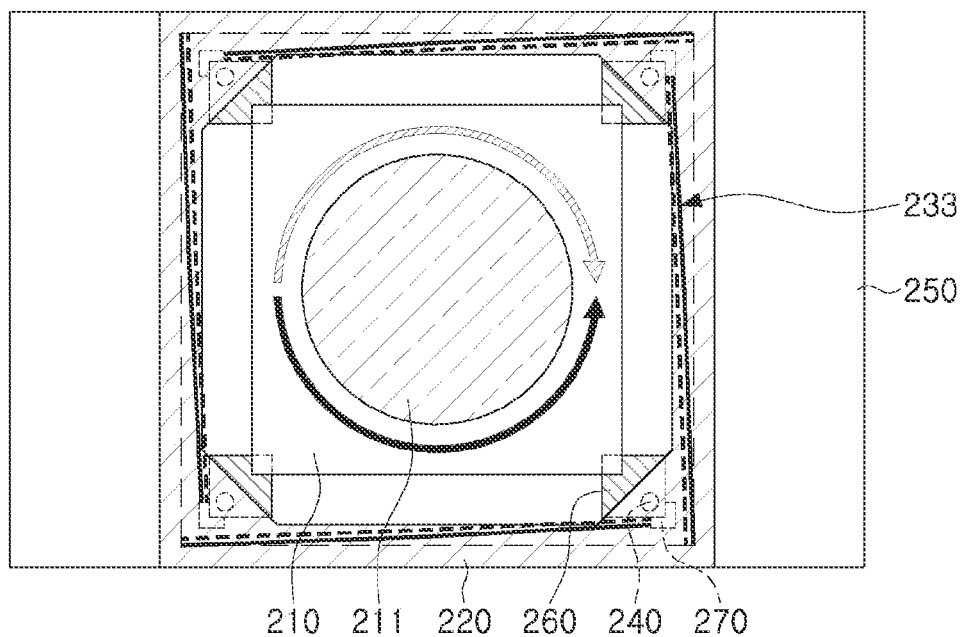
FIG. 12 is a conceptual view illustrating a modified example of a camera module illustrated in the conceptual diagrams of FIGS. 11A and 11B.

FIGS. 9 and 10 are conceptual diagrams illustrating modified examples of a camera module illustrated in the conceptual diagrams of FIGS. 8A and 8B, and FIG. 12 is a conceptual diagram illustrating a modified example of a camera module illustrated in the conceptual diagrams of FIGS. 11A and 11B.

Modified examples of shape memory alloy wires are illustrated in FIGS. 9, 10 and 12.

Referring to FIGS. 9 and 12, a driving portion may be provided as a shape memory alloy cantilever 133 or 233.

The shape memory alloy cantilever 133 or 233 may be simultaneously connected to a first housing 110 or 210 and a second housing 120 or 220. One side of the shape memory alloy cantilever 133 or 233 may be connected to the vicinity of a corner of the first housing 110 or 210, and the other side of the shape memory alloy cantilever 133 or 233 may be connected to an extension portion 121 or 221 of the second housing 120 or 220.

In this case, the other side of the shape memory alloy cantilever 133 or 233 may be connected to the first extension portion 121 or 221 of the second housing 120 or 220 on a side of the remaining corners of the first housing 110 and 210 to which the shape memory alloy cantilever 133 or 233 is not connected.

The shape memory alloy cantilevers 133 or 233 may be disposed to be symmetrical with respect to an optical axis (the Z-axis), and may be disposed to have a rhombic shape on a plane, perpendicular to the optical axis direction (the Z-axis direction).

The shape memory alloy cantilevers 133 and 233 may be provided in a unimorph type or a bimorph type. The shape memory alloy cantilever 133 or 233 may include a shape memory alloy wire and a flexible layer.

The shape memory alloy cantilevers 133 and 233 may be bent due to contraction or relaxation of a shape memory alloy when a voltage is applied. Accordingly, the first housing 110 or 210 may be rotationally driven. A direction, in which the first housing 110 or 210 rotates, may be determined depending on a direction in which the shape memory alloy cantilever 133 or 233 is bent.

Referring to FIG. 10, the shape memory alloy wire 134a, 134b may be provided to be directly coupled to the spring 140. The shape memory alloy wire 134a, 134b and the spring 140 may be driven together with a cantilever while being coupled to each other. According to the present example, the spring 140 may simultaneously serve as a driving portion and a guide member.

Figure 13:
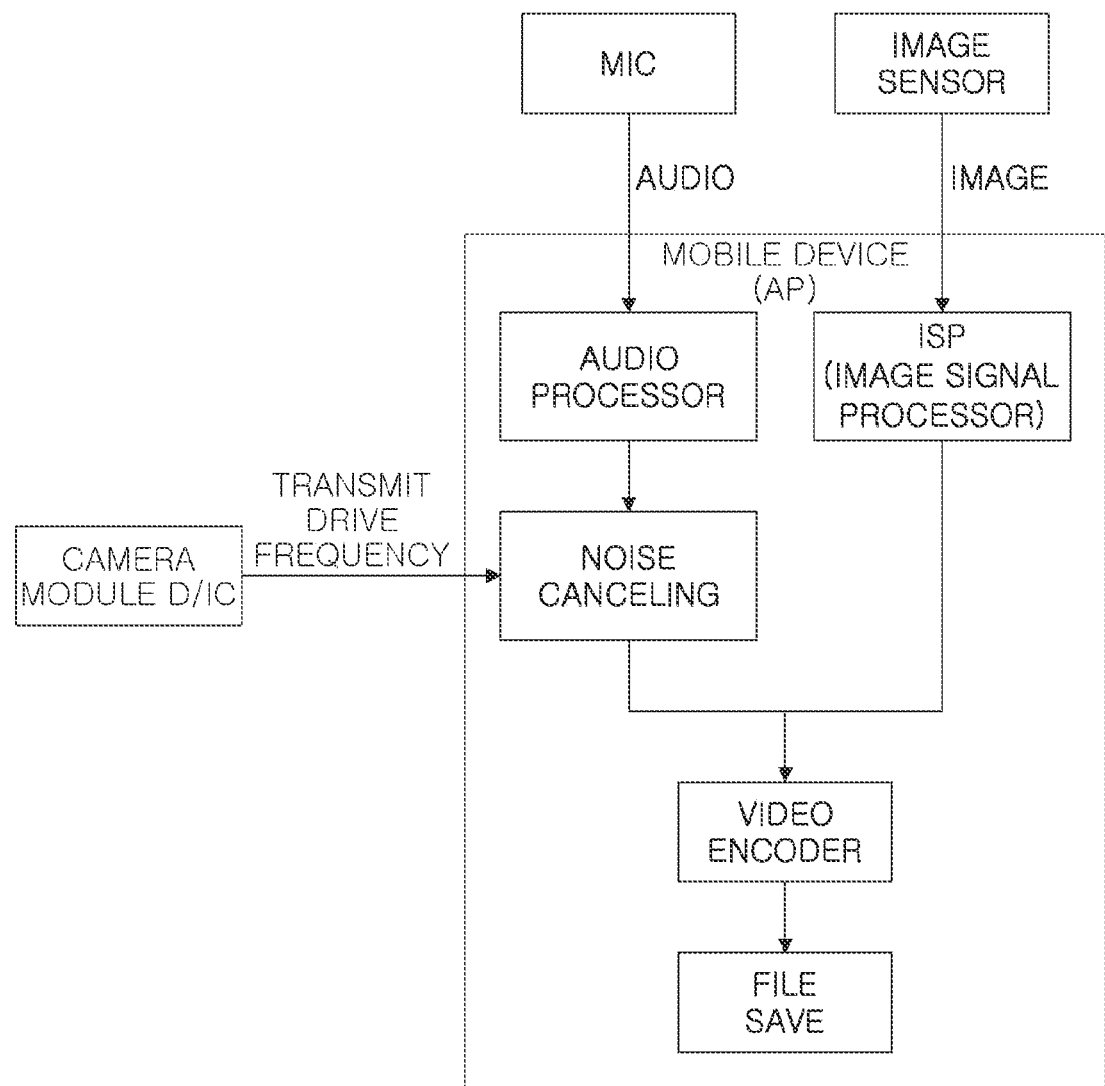
FIG. 13 is a conceptual diagram illustrating a noise canceling function of the present disclosure.

FIG. 13 is a conceptual diagram illustrating a noise canceling function of the present disclosure.

According to the present disclosure, noise may be generated by vibration generated when a driving portion is driven. For example, during video recording, noise caused by driving of the driving portion may be recorded together with video through a microphone.

Accordingly, the camera module 100 or 200 according to an example may attenuate noise of a specific frequency, generated by the driving of the driving portion, using a noise canceling algorithm.

In the case of a mobile device such as a smartphone, a tablet PC, or the like, during video recording, an image sensor senses video information, a microphone MIC senses audio information, and video and audio information sensed by the image sensor and the microphone is transmitted to an application processor (AP) of the mobile device to be converted into a digital file and then stored.

According to the present disclosure, a noise canceling algorithm may be applied during conversion of the video and audio, sensed by the image sensor and the microphone, into the digital file.

The noise canceling algorithm according to the present disclosure may include a process in which when the camera module 100 or 200 transmits a noise frequency, generated when a driving portion is driven, to a mobile device, the mobile device filters the corresponding frequency.

A driver integrated circuit (D/IC) of the camera module 100 or 200 may perform communications (UART, 120, SRI, or the like) with the AP of the mobile device.

The D/IC of the camera module 100 or 200 may transmit the noise frequency, generated when the driving portion is driven, to the AP of the mobile device.

The AP of the mobile device may filter the frequency, transmitted from the D/IC of the camera module 100 or 200, using a low-pass filter (LPF) and/or a high-pass filter (HPF) and may store the file after encoding the file.

Accordingly, a file, from which noise caused by driving is removed, may be finally stored in the mobile device.

The camera module 100 or 200 according to an example may compensate for shaking in a roll direction with an optical axis (a Z-axis) as a rotation axis while significantly reducing an increase in thickness thereof in an optical axis direction (a Z-axis direction). In addition, image distortion, occurring during capturing using the camera module 100 or 200, may be suppressed through correction in the roll direction.

As described above, a camera module according to an example may compensate for shaking in a roll direction with an optical axis of the camera module as a rotation axis.

While specific examples have been shown and described above, it will be apparent after an understanding of this disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module comprising:
   a lens module including at least one lens;
   a first housing accommodating the lens module therein;
   an image sensor disposed in the first housing;
   a second housing accommodating the first housing therein;
   a driving portion disposed in the second housing and configured to rotationally drive the first housing around an optical axis; and
   a guide member disposed between the first housing and the second housing,
   wherein the guide member comprises a spring, and the spring has a greater thickness in an optical axis direction than in a direction perpendicular to the optical axis direction.

2. The camera module of claim 1, wherein
   the spring comprises a bent portion bent a plurality of times, and the bent portion is connected to the first housing in the vicinity of a corner of the first housing.

3. The camera module of claim 1, wherein
   the second housing comprises:
      a first extension portion extending in the optical axis direction; and
      a second extension portion extending in a direction perpendicular to the optical axis direction.

4. The camera module of claim 1, further comprising:
   a base electrically connected to at least one of the driving portion and the image sensor.

5. The camera module of claim 1, wherein
   the driving portion comprises at least one piezoelectric material disposed in the second housing.

6. The camera module of claim 1, wherein
   the driving portion comprises a plurality of shape memory alloy wires, and the plurality of shape memory alloy wires are disposed to be symmetrical with respect to the optical axis.

7. A camera module comprising:
   a lens module including one or more lenses disposed on an optical axis to refract light reflected from a subject;
   a first housing accommodating the lens module therein;
   an image sensor disposed in the first housing, and configured to convert light incident through the one or more lenses into an electrical signal;
   a second housing accommodating the first housing therein;
   a driving portion disposed in the second housing and configured to rotationally drive the first housing relative to the second housing around the optical axis; and
   a guide member extending from the first housing into the second housing in a plane perpendicular to the optical axis,
   wherein the second housing prevents movement of the guide member out of the plane perpendicular to the optical axis.

8. The camera module of claim 7, wherein the guide member comprises a spring, and the spring has a greater thickness in an optical axis direction than in a direction perpendicular to the optical axis direction.

9. The camera module of claim 7, wherein the guide member comprises a plurality of ball members, and one or more balls of the plurality of ball members are disposed between surfaces on which the first housing and the second housing oppose each other in an optical axis direction.

* * * * *